(12) United States Patent
Hunt (10) Patent No.: US 9,845,701 B2
(45) Date of Patent: Dec. 19, 2017

(54) METHOD AND SYSTEM FOR VARYING THE WIDTH OF A TURBINE NOZZLE

(71) Applicant: Fluid Equipment Development Company, LLC, Monroe, MI (US)

(72) Inventor: Jason B. Hunt, Monroe, MI (US)

(73) Assignee: Fluid Equipment Development Company, LLC, Monroe, MI (US)

( * ) Notice: Subject to any disclaimer, the term of this patent is extended or adjusted under 35 U.S.C. 154(b) by 320 days.

(21) Appl. No.: 14/629,996

(22) Filed: Feb. 24, 2015

(65) Prior Publication Data

US 2015/0240655 A1 Aug. 27, 2015

Related U.S. Application Data

(60) Provisional application No. 61/944,294, filed on Feb. 25, 2014.

(51) Int. Cl.
*F01D 17/00* (2006.01)
*F01D 1/02* (2006.01)
(Continued)

(52) U.S. Cl.
CPC ............ *F01D 17/00* (2013.01); *B01D 61/06* (2013.01); *F01D 1/02* (2013.01); *F01D 17/143* (2013.01); *B01D 61/025* (2013.01); *B01D 2313/243* (2013.01); *B01D 2313/246* (2013.01); *F01D 17/02* (2013.01); *F01D 17/14* (2013.01);
(Continued)

(58) Field of Classification Search
CPC .......... F01D 17/00; F01D 17/143; F01D 1/02; F01D 17/02; F01D 17/14; F01D 17/141; F01D 17/146; F01D 9/041; F01D 9/048; B01D 61/06; B01D 2313/246;
(Continued)

(56) References Cited

U.S. PATENT DOCUMENTS 4,219,305 A * 8/1980 Mount .................. F04D 29/464
 415/13
4,503,684 A * 3/1985 Mount ................ F04D 27/0246
 415/14
(Continued)

FOREIGN PATENT DOCUMENTS

FR 667306 A 10/1929
GB 305214 A * 10/1929 ........... F04D 29/464
WO 2011/067577 A2 6/2011

OTHER PUBLICATIONS

International Search Report and Written Opinion of the ISA for Application No. PCT/US2015/017520. ISA/EP Rijswijk, NL, dated Jul. 15, 2015.

*Primary Examiner* — Woody Lee, Jr.
*Assistant Examiner* — Behnoush Haghighian
(74) *Attorney, Agent, or Firm* — Harness, Dickey & Pierce, PLC (57) ABSTRACT

A turbine and method of operating the same a turbine includes a housing having a volute, an inlet and an outlet an impeller rotatable coupled to the housing, a first shroud disposed within the housing comprising a plurality of nozzle vanes and a second shroud disposed within the housing adjacent to the first shroud so that a nozzle area is formed between the first shroud and the second shroud, said nozzle area having a variable width. The second shroud is movable relative to the first shroud to vary the width so that fluid flow from the inlet to the outlet is variable.

15 Claims, 8 Drawing Sheets

(51) Int. Cl.
*B01D 61/06* (2006.01)
*F01D 17/02* (2006.01)
*F01D 17/14* (2006.01)
*B01D 61/02* (2006.01)

(52) U.S. Cl.
CPC .......... *F01D 17/141* (2013.01); *F01D 17/146* (2013.01); *F05D 2220/40* (2013.01)

(58) Field of Classification Search
CPC ............ B01D 2313/243; B01D 61/025; F05D 2220/40; F04D 29/524
See application file for complete search history.

(56) References Cited

U.S. PATENT DOCUMENTS

| | | | |
|---|---|---|---|
| 7,927,067 B2* | 4/2011 | Rajamani | F01D 17/02 415/118 |
| 8,291,703 B2* | 10/2012 | Garrett | F01D 17/167 415/158 |
| 8,657,568 B2* | 2/2014 | McAuliffe | F01D 17/143 415/145 |
| 2003/0010029 A1* | 1/2003 | Lutz | F01D 17/167 60/602 |
| 2008/0271449 A1* | 11/2008 | Roberts | F01D 17/143 60/602 |
| 2012/0121392 A1* | 5/2012 | Azuma | F02B 37/24 415/151 |
| 2012/0286066 A1* | 11/2012 | Holroyd | F01D 17/143 239/265.11 |

* cited by examiner

METHOD AND SYSTEM FOR VARYING THE WIDTH OF A TURBINE NOZZLE

RELATED APPLICATION

This application is a non-provisional application of provisional application 61/944,294, filed Feb. 25, 2014, the disclosure of which is incorporated by reference herein.

TECHNICAL FIELD

The present disclosure relates generally to turbines, and, more specifically, to a method and system for varying the width of a turbine nozzle.

BACKGROUND

The statements in this section merely provide background information related to the present disclosure and may not constitute prior art.

Turbochargers are used for many applications. A turbocharger includes a pump portion and a turbine portion. Turbochargers are used for recovering energy from a pressurized stream of fluid. Excessive pressure in the turbine portion is used to drive the pump portion. One use for a turbocharger is recovering energy from a brine outlet of a reverse osmosis membrane assembly.

Reverse osmosis systems operate in a wide range of operating conditions for any given flow while seeking to maintain a high level of performance. Various turbine configurations are known for improving levels of performance for the turbine.

In addition to reverse osmosis systems turbines may be used in many applications. Different applications require different operating characteristics. Conventional turbines typically have a nozzle and an impeller that have a fixed relationship thereto.

SUMMARY

The present disclosure provides a turbine design that allows the turbine width to be changed to vary the amount of fluid through the nozzle or nozzles to vary the hydraulic range. That is, the pressure and flow variations increase with the change of the nozzle area.

In one aspect of the disclosure, a turbine includes a housing having a volute, an inlet and an outlet an impeller rotatable coupled to the housing, a first shroud disposed within the housing comprising a plurality of nozzle vanes and a second shroud disposed within the housing adjacent to the first shroud so that a nozzle area is formed between the first shroud and the second shroud, said nozzle area having a variable width. The second shroud is movable relative to the first shroud to vary the width so that fluid flow from the inlet to the outlet is variable.

In another aspect of the disclosure, method of operating a turbine having a housing comprises communicating fluid from a volute of the turbine through a nozzle width between a first shroud and a second shroud to rotate an impeller on a shaft, communicating fluid to a first control cavity disposed between a piston of the second shroud and a pocket in the housing, moving the second shroud relative to the first shroud to change the nozzle width in response to communicating fluid to the first control cavity and thereafter, changing an amount of fluid passing through the nozzle width.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

The present disclosure improves the hydraulic range of a turbine by allowing a nozzle area or width to be increased or decreased depending upon the various operating conditions. As will be described below, a stationary shroud is attached to the turbine housing, the nozzle vanes are attached to the stationary shroud. A movable shroud moves inside a pocket within the turbine housing to allow the nozzle area to be increased or decreased.

The turbocharger described below may be used for various types of systems, including a reverse osmosis system. Non-hydraulic applications such as natural gas processing may also be performed. Further, the valves used in the turbocharger may be controlled based upon various process parameters.

Figure 1A:
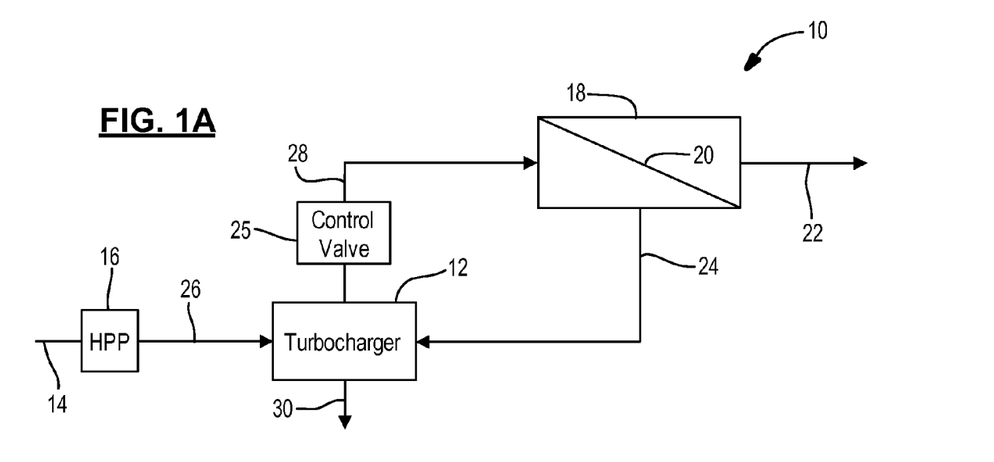
FIG. 1A is a block diagrammatic view of a reverse osmosis system that includes a turbocharger.

Referring now to FIG. 1A, a reverse osmosis system 10 that includes a turbocharger 12 is set forth. In this example, feed fluid from an input manifold 14 is communicated through a high pressure pump 16 which in turn is communicated to a membrane housing 18 through the turbocharger 12. The membrane housing 18 includes a reverse osmosis membrane 20 that is used to generate fresh water from sea water. Fresh water is generated at the permeate output 22 of the membrane housing. A brine stream from the membrane housing is directed to an inlet 24 of the turbocharger 12. Brine to the turbocharger 12 recirculates through a brine control valve 25. The turbocharger 12 uses the energy from the high pressure brine stream to increase feed fluid pressure. The pressurized feed fluid from the high pressure pump 16 is received through a pump input 26. The turbocharger 12 increases the pressure of the feed fluid and increases the pressure of the feed fluid at the pump output 28. Waste from the turbocharger 12 is discharged at a lower pressure through the turbocharger outlet 30. Although one specific example of a reverse osmosis system 10 is illustrated, various examples for reverse osmosis systems will be evident to those skilled in the art. By providing the turbocharger 12, the required pressure from the high pressure pump is reduced and the overall energy consumed by the system is also reduced as compared to a system without the turbocharger 12.

Figure 1B:
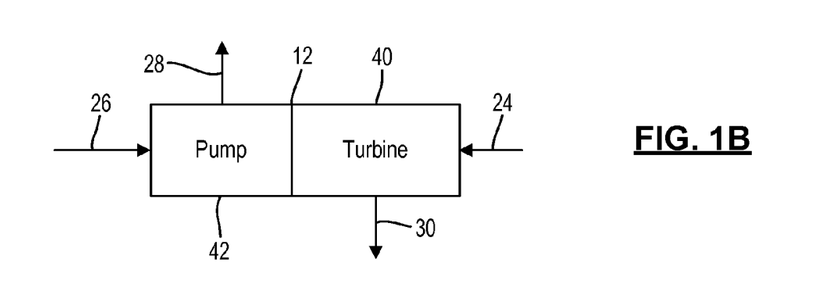
FIG. 1B is a block diagrammatic view of the turbocharger of FIG. 1A.

Referring now to FIG. 1B, the turbocharger 12 is illustrated in further detail. The turbocharger 12 includes a turbine portion 40 and a pump portion 42. The turbine portion 40 recovers energy from the high pressure stream by rotating and ultimately rotating the components within the pump portion 42. The pump is used to increase the pressure of fluid to the input of the membrane housing 18.

Figure 1C:
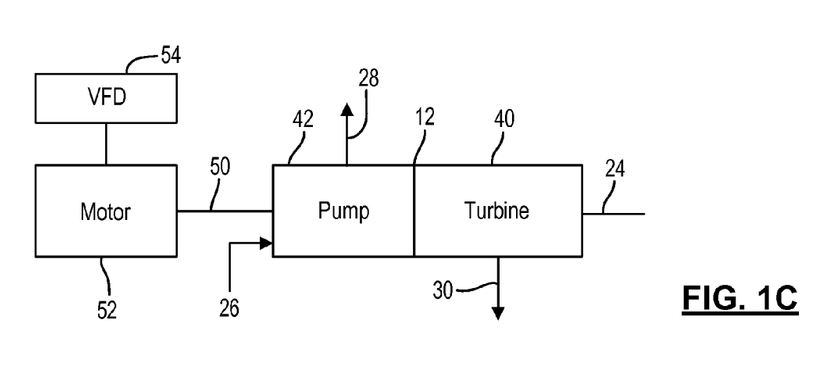
FIG. 1C is a block diagrammatic view of a turbocharger and motor assembly referred to as a HEMI.

Referring now to FIG. 1C, the turbocharger 12 may also be incorporated into a system that includes a common shaft 50 that extends not only through the pump and turbine portion illustrated in FIG. 1B but extends to a motor 52. The motor 52 includes a controller 54 the addition of the motor 52 allows the turbocharger to act as a pump when desired. The motor 52 may also act as a generator to recover the excess power generated.

Figure 2A:
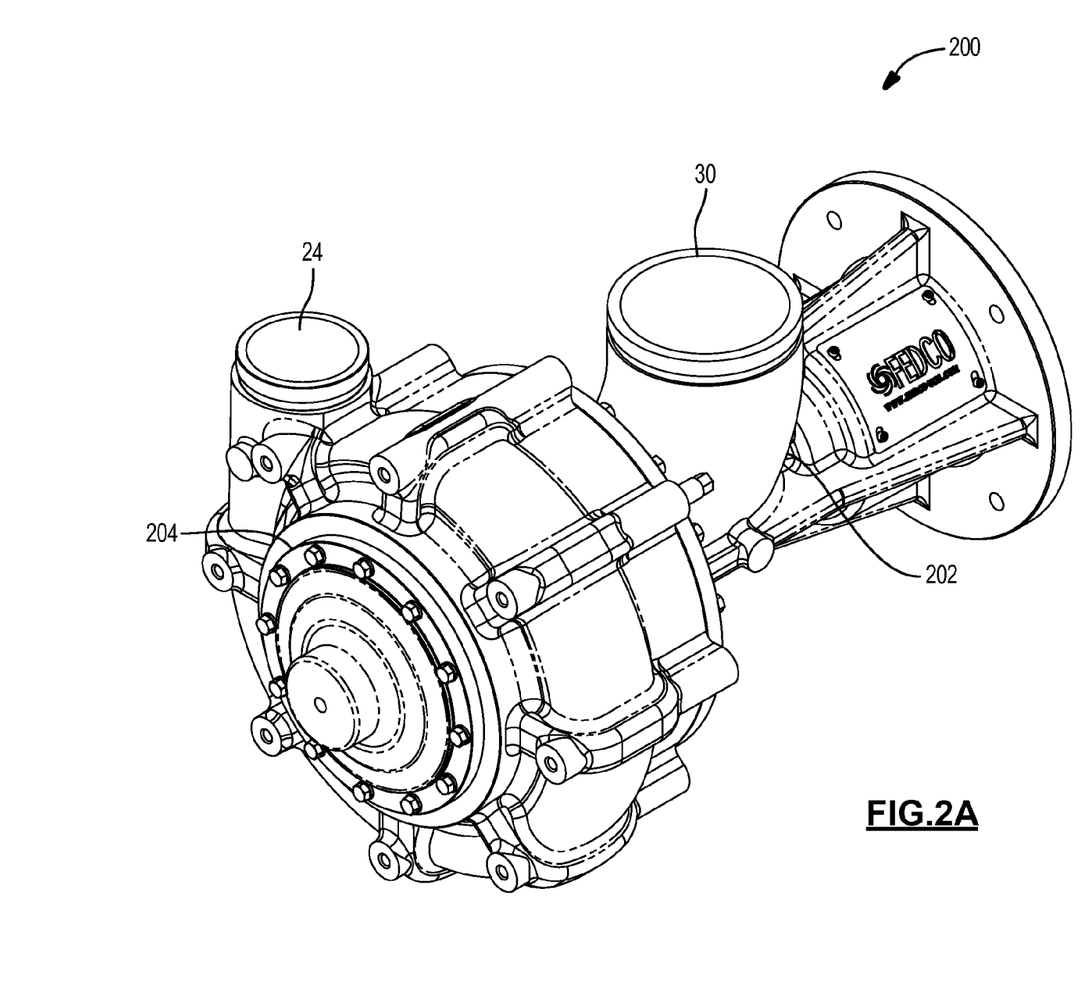
FIG. 2A is a perspective view of the turbocharger according to the present disclosure.
Figure 2B:
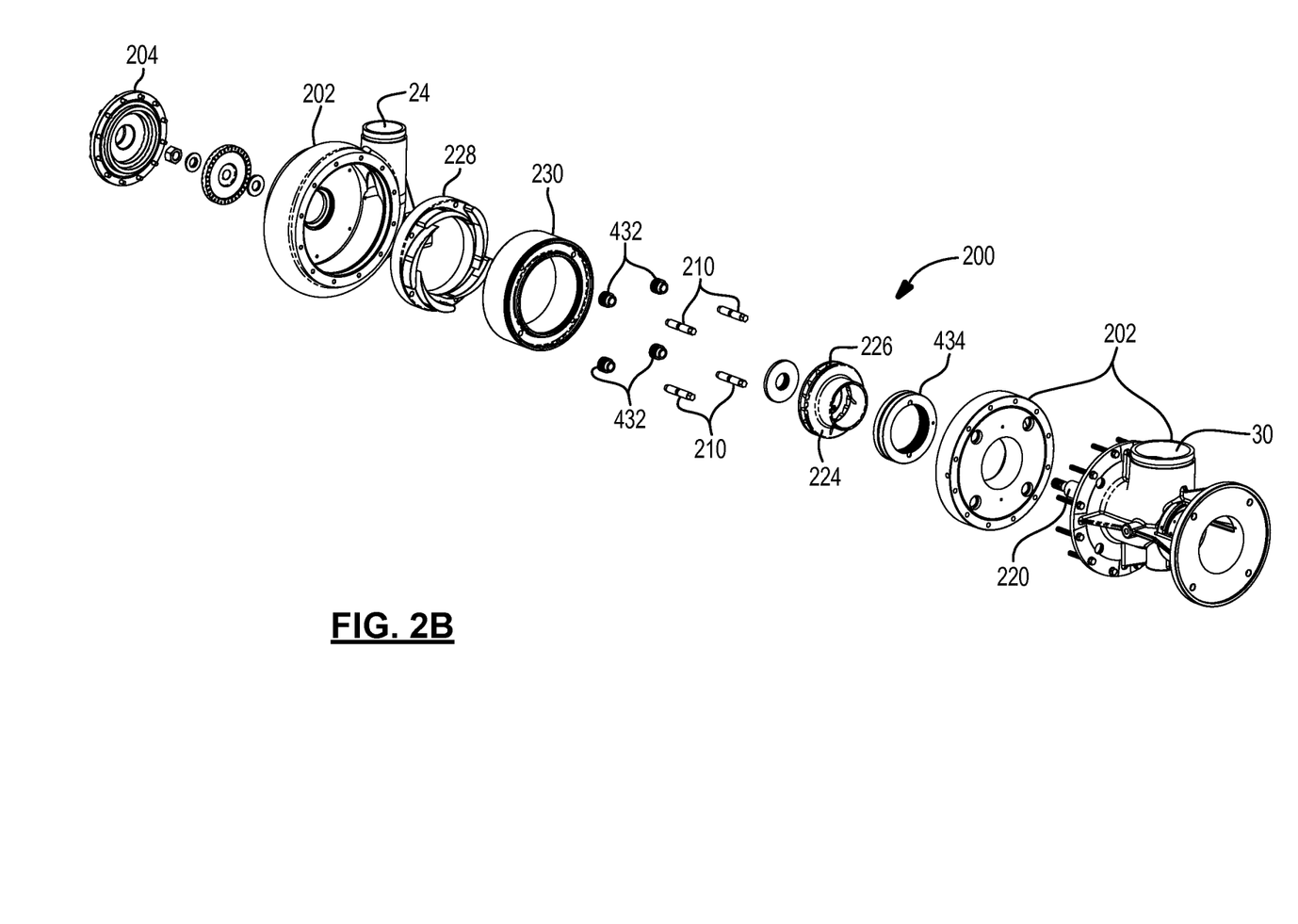
FIG. 2B is an exploded view of the turbocharger.

Referring now to FIGS. 2A and 2B, an assembled view and an interior view of a turbine assembly 200 are illustrated. In this example, the turbine assembly 200 includes a turbine housing assembly 202 and a turbine end cap assembly 204. The turbine housing assembly 202 includes the inlet 24, which in the example of a reverse osmosis system is a brine stream inlet. The end cap assembly 204 includes the turbine outlet 30.

The end cap assembly 204 has one or more linear guides 210 that are in communication with a position sensor 212. Each linear guide 210 is movable in a direction parallel with the axis of the turbine outlet 30. The linear guide 210 may extend into the turbine assembly 200 a varying amount. In the example set forth, four linear guides are illustrated. A fewer number or greater number of guides may be used.

Figure 3:
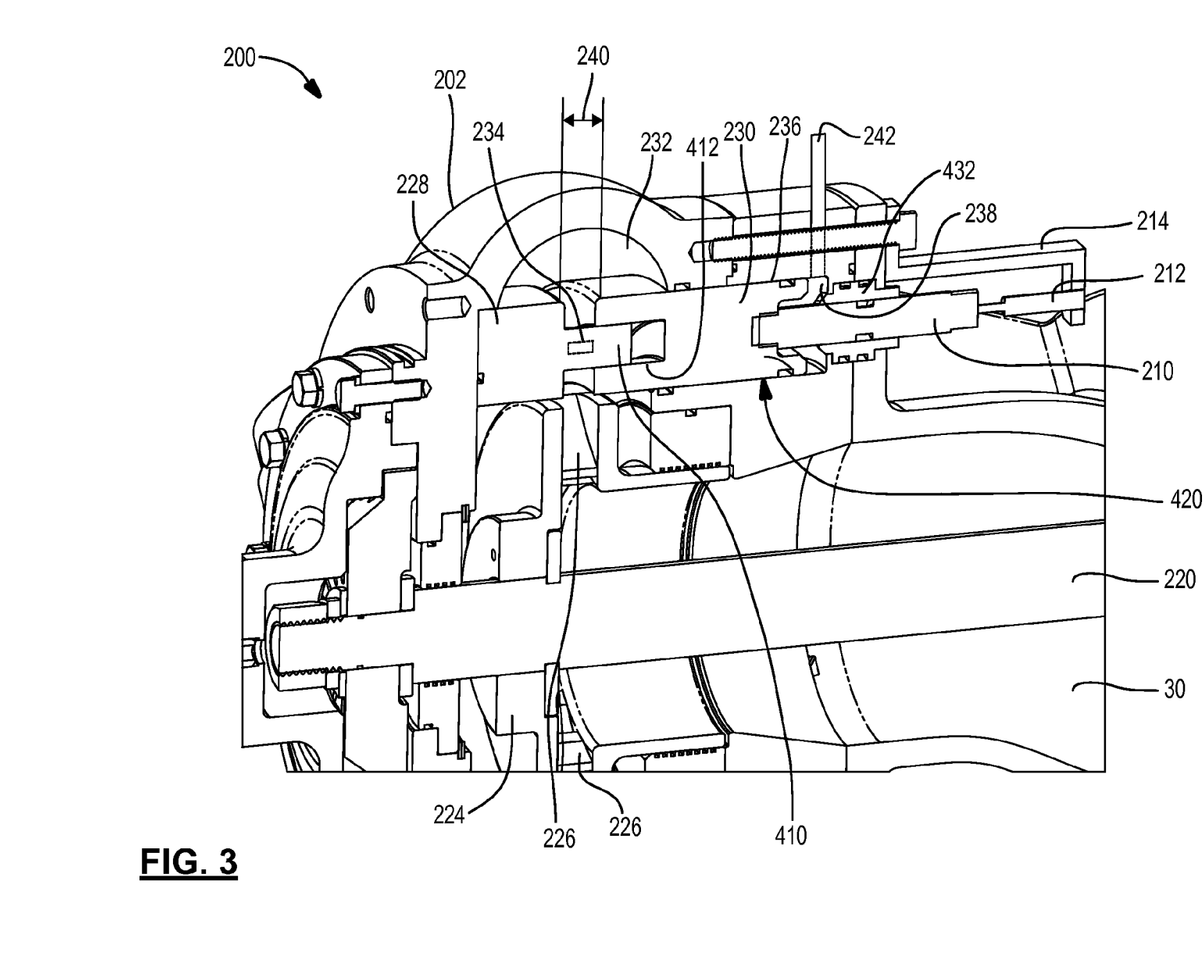
FIG. 3 is a cutaway perspective view of a variable width turbine nozzle for a turbocharger.

A position sensor 212 may be coupled to the housing 202 with a holder 214 (of FIG. 3). The position sensor 212 may be various types of sensors used to measure the position of the linear guide 210 resistance. The position sensor 212 may, for example, be formed of a linear potentiometer that changes an output or voltage based upon the position of the linear guide 210. The position sensor 212 may also be a linear encoder that provides the relative position of the linear guide 210 to a controller as described below. The position sensor 212 may also be comprised of a limit switch if exact positions of the seal system are not required. Details of the linear guide 210 and the position sensor 212 will be described in more detail below.

Referring to FIG. 3, the turbine assembly 200 has a shaft 220 that extends into the shaft opening 222. The shaft 220 is coupled to and rotates with a turbine impeller 224. The shaft 222 represents the axis of rotation of the impeller 224. The shaft 220 may extend out of the turbine housing 202 into the pump portion of the turbocharger as described above. The impeller 224 has impeller vanes 226 that are used to receive pressurized fluid and rotate the shaft 220.

A first shroud 228 in this example is a stationary shroud. The first shroud 228 is coupled to the housing 202. In this example, the first shroud 228 is a stationary shroud fixably coupled to the housing 202. A second shroud 230 is movably coupled to the housing 202. The second shroud 230 may move relative to the housing 202. That is, the second shroud 230 may be slidably mounted to the housing 202. The first shroud 228 has nozzle vanes 234 thereon. The nozzle vanes 234 direct fluid to the impeller vanes 226 which in turn rotate the impeller 224.

The second shroud 230 may be at least partially received in a pocket 236. The portion of the second shroud 230 may be referred to as a piston as will be described in more detail below. The shroud 230 forms a control cavity 238.

The first shroud 228 and the second shroud 230 cooperate to separate the volute from the impeller 224. The first shroud 228 and the second shroud 230 cooperate to form a nozzle area having a nozzle width 240 therebetween. The movement of the second shroud 230 expands or reduces the nozzle width 240 through which fluid passes. In some examples, the first shroud 228 and the second shroud 230 may be moved together so that no fluid may pass to the impeller 224. In this configuration, the first shroud 228 and the second shroud 230 act as a valve to eliminate the flow of fluid through the turbocharger.

A port 242 through the housing 202 allows fluid to enter and leave the control volume 238 defined between the second shroud 230 and the walls of the pocket 236.

Figure 4:
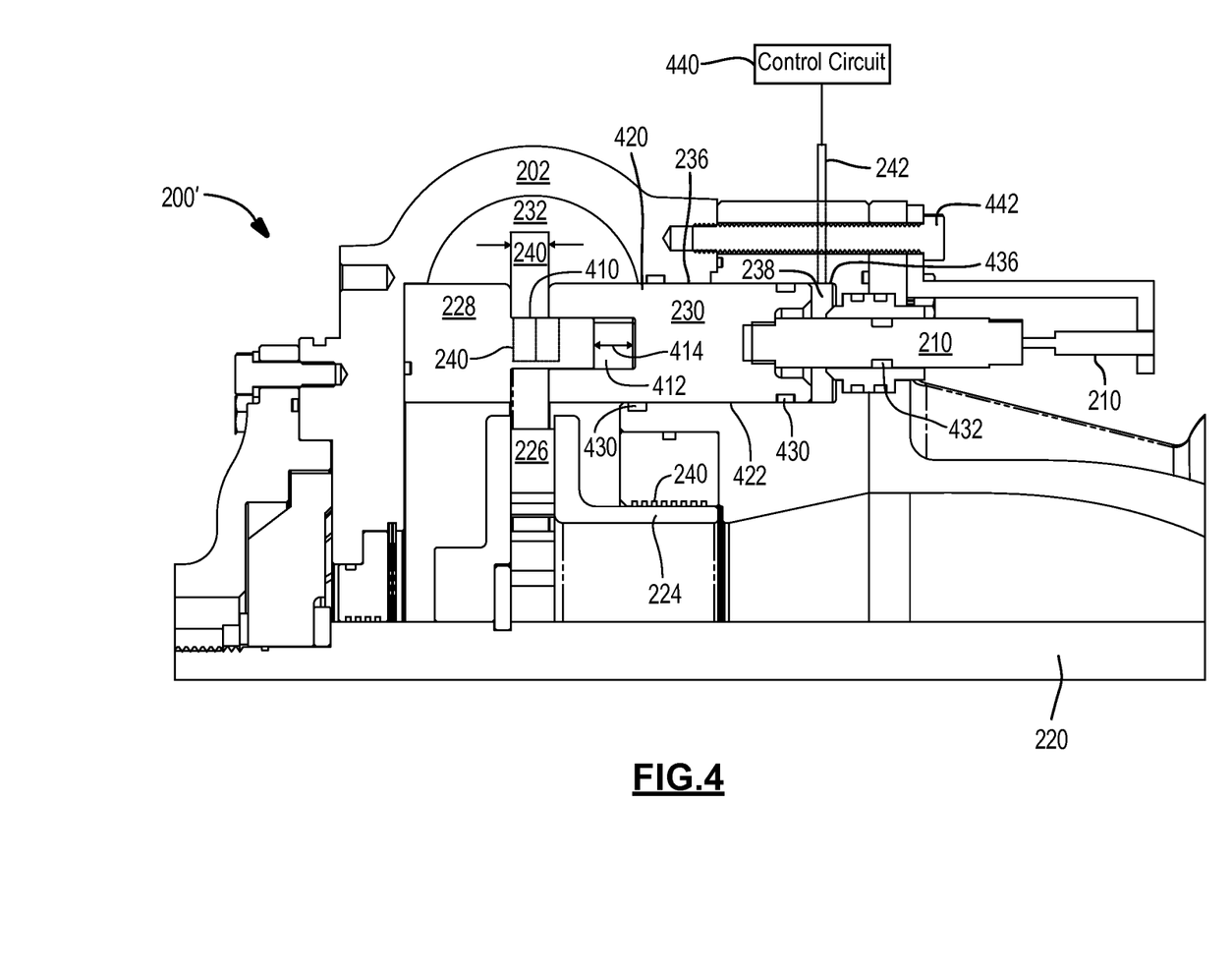
FIG. 4 is a cutaway view of a turbocharger formed according to the present disclosure.

Referring now to FIG. 4, details of the first shroud 228 and the second shroud 230 are illustrated in further detail. In this example, the linear guide 210 is shown fixably coupled to the movable shroud 230. The first shroud 228 may include an extension 410 that is received within a receiver 412 of the second shroud 230. The extension 410 moves in directions indicated by the arrows 414.

The movable shroud 230 forms a piston 420 that includes sidewalls 422 and head 424. The piston 420 is received within the pocket 236 to form a control cavity 238. Seals 430 seal the control cavity 238 from the volute 232 and the impeller cavity. This makes the control cavity 238 independent from the volute 232. The seals 430 allow the piston 422 to move in an axial direction. Seals 432 receive the linear guide also allow linear movement of the linear guide 210.

The port 242 leading from a control circuit 440 to the control cavity 238 is illustrated in further detail. The control circuit 440 may be a combination of valves that are electrically controlled and fluid paths that are used to flow fluid into the port 242 to control the movement of the movable shroud 230. The control circuit 440 is illustrated in further detail below.

Fasteners 442 may be used to secure the portions of the housing 202 together.

Figure 5:
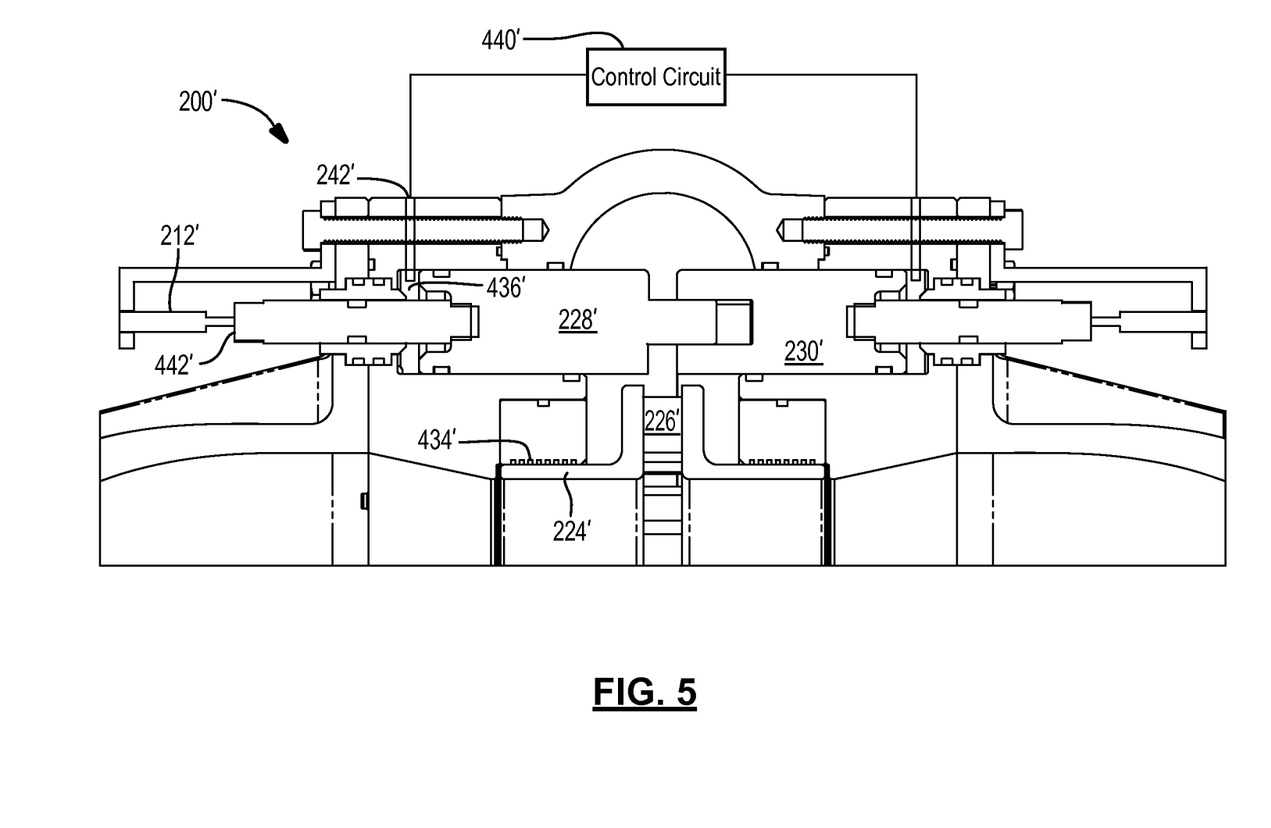
FIG. 5 is an alternative example of a turbocharger having two moving shrouds.

Referring now to FIG. 5, a second example of a turbocharger assembly 200' is illustrated. The right half of the drawing is identical to FIG. 4. However, in the left half of the drawing, the shroud 228 of FIG. 4 has been replaced with a shroud 228'. The shroud 228' is a movable shroud 230'. The movable shroud 228' has generally the same shape as the stationary shroud 228 illustrated in FIG. 4 in terms of the extension 410. However, a piston 420', a sidewall 422' and a head 424' are received within a pocket 436' of the housing 202 has been included to obtain movement of the shroud 228'.

In this example, the control circuit 440' applies fluid to the port 242' and control cavity 436' to move shroud 228' toward the shroud 230' which in this example is the direction of the outlet and shaft. In this example, both shrouds 228' and 230 are movable shrouds. Also, the impeller 224' has an extended portion so that wear rings 434' are implemented on the first shroud side.

Figure 6A:
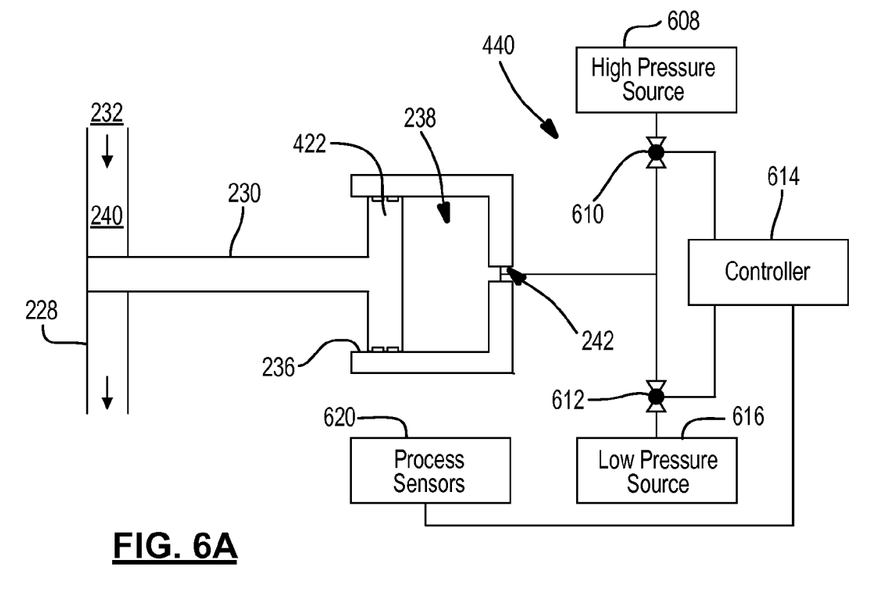
FIG. 6A is a schematic view of a control circuit for control of the movable shroud in a closed nozzle position relative to a stationary shroud.

Referring now to FIG. 6A, a hydraulic control diagram is illustrated that illustrates the control circuit 440 for providing fluid to the control cavity 238. In this example, the stationary shroud 228 and the movable shroud 230 are shown in a closed position. That is, the fluid from the volute 232 does not travel through the nozzle width 240. In this example, valve 610 is in an open position to allow high pressure fluid into the control cavity 238 through the control port 242. The low pressure valve 612 is in a closed position. A controller 614 controls the operation of the valves. During operation, typically either the high pressure valve 610 or the low pressure valve 612 is open to allow a varying amount of fluid to pass though the nozzle width. The valves 610 and 612 may be normally closed valves. However, during a cleaning process or other type of process, both valves 610 and 612 may be opened. The controller 614 is in communication with a plurality of process sensors 620. The process sensors 620 may include the position sensor 612 illustrated above. Other types of sensors such as temperature sensors, flow sensors, flow rate sensors, or the like may be used by the controller 614 to determine whether to open or close the high pressure valve 610 or the low pressure valve 612 to change the amount of fluid passing through the nozzle width. It should be noted that both valves 610 and 612 may be closed when no change is desired in the position of the shroud 230 or nozzle width. From an at rest position, the movable shroud 230 may be moved by introducing high pressure fluid into the control port 242. To move the piston 420 toward the control port 242, low pressure may be exposed to the control cavity 238 through the low pressure valve 612. The pressure within the turbine is high and thus the pressure on the shroud 230 will move the piston toward the control port 242 so that the control cavity 238 is reduced in volume.

Feedback control is achieved by periodically monitoring the process variables using the process sensors 620. The controller 614, in response to the process sensors 620, open and close the appropriate valves 610, 612 to change the nozzle width. The process variables are described below;

P—Process variable, measured value.
S—Set point for process.
E—Current error (percent).
K—Proportional gain (~1, tunable value).
D—Deadband in percent (typically 1%).
T—Update time period (typically 5 seconds).
$T_O$—Valve open time period.
$T_C$—Valve close time period.

| Loop Forever | |
|---|---|
| E = (P − S)/S | Calculate error percentage |
| If E > 1 then E = 1 | Limit error to range [−1 . . . 1] |
| If E < −1 then E = −1 | |
| $T_o$ = K E T | Compute valve open time |
| $T_c$ = T − $T_o$ | Compute valve closed time |
| If E > D, | Check for outside of deadband |

| -continued | |
|---|---|
| Loop Forever | |
| Open $V_1$ for time $T_o$ | Open $V_1$ to close sidewall |
| Close $V_1$ for time $T_c$ | |
| If E < −D, | Check for outside of deadband |
| Open $V_2$ for time $T_o$ | Open $V_2$ to open sidewall |
| Close $V_2$ for time $T_c$ | |

In the above algorithm the error percentage is calculated between a range of −1 and +1. The valve open time and the valve close time may be calculated using a proportional gain, a current error and an update. A deadband D may be compared to the current error. When the current error is outside of the deadband, the valve may be opened or closed. That is, when the error is greater than the deadband, valve 610 is opened to close the amount of nozzle width. When the error is less than the negative deadband, then the valve 612 is opened so that the piston moves toward the control port.

Figure 6B:
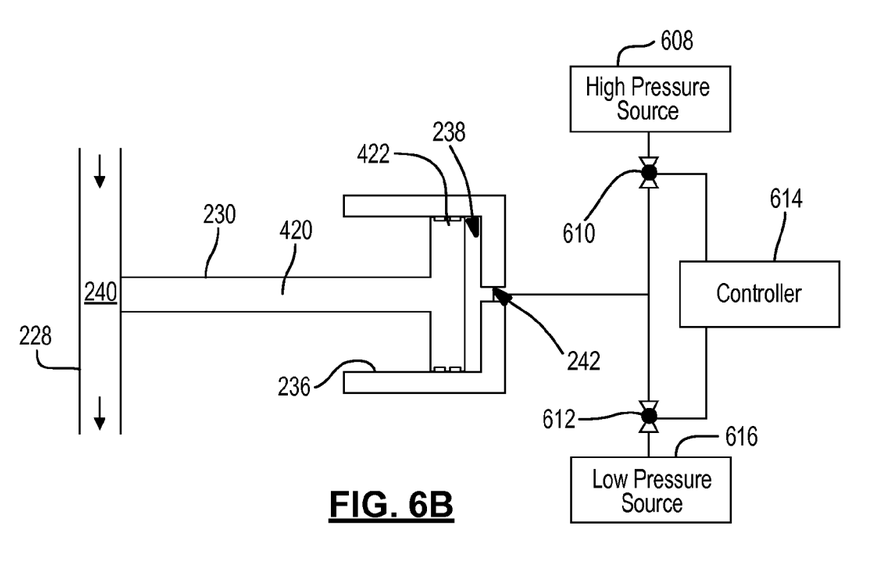
FIG. 6B is a schematic view of a control circuit for control of a movable shroud in an open nozzle position relative to a stationary shroud.

Referring now to FIG. 6B, the piston 420 is illustrated toward the control port 242. To move the piston 420 toward the control port 242 as compared to that in FIG. 6A, the high pressure valve is 610 is closed and the low pressure valve 612 is opened. Pressure on the shroud 230 from within the turbine moves the shroud 230 and piston 420 toward reducing the control cavity 238.

In both FIGS. 6A and 6B high pressure source 608 and the low pressure source 616 may be hydraulically coupled to the turbocharger. That is, the high pressure source 608 may be in fluidic communication with the turbocharger inlet which is a high pressure source. The low pressure source 616 may be the turbocharger outlet.

Figure 7A:
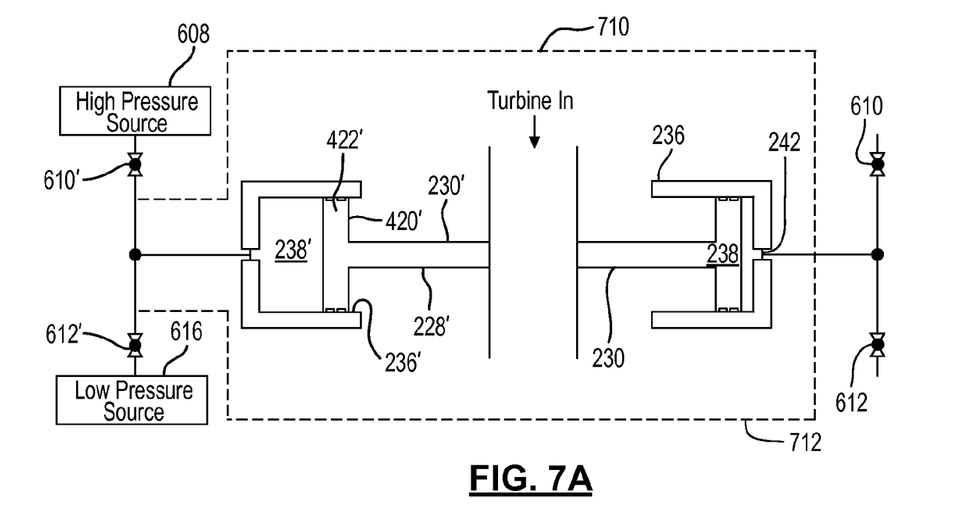
FIG. 7A is a schematic view of a control circuit for control of the movable shroud in a closed nozzle position relative to another movable shroud.

Referring now to FIG. 7A, a control diagram for a system using two movable shrouds 228' and 230 are illustrated. For simplicity the controller 614 and sensors 620 of FIGS. 6A, B are not shown but would be configured in the same way. This corresponds to the configuration set forth in FIG. 4 above but with two moving shrouds. In this example, the high pressure source 608 is in communication with both a first control cavity 238 and a second control cavity 238'. The control cavities are formed within the housing 202 of the turbine. The first shroud 228' has a piston 420' that moves within a pocket 236'.

The high pressure source 608 may be coupled to the control cavity 238' through a valve 610'. The low pressure source 616 may be in communication with the control cavity 238' through a low pressure valve. In other examples only one set of valves may be required that control both the first shroud 228' and the second shroud 230. Using only two valves is possible when control of both of the shrouds 228' and 230 is desirable at the same time. This is illustrated with the fluid paths 710 (illustrated in dotted lines) from the outlet of the valve 610' to the control port 242 of the first control cavity 238 and the fluid path 712 from the outlet of the valve 612' to the control port 242 of the first control cavity 238. In certain operating conditions wanting more control, the example illustrated in FIG. 7 may be provided through the use of four valves. In FIG. 7A the shrouds are in the most open position so that the nozzle width is the greatest.

Figure 7B:
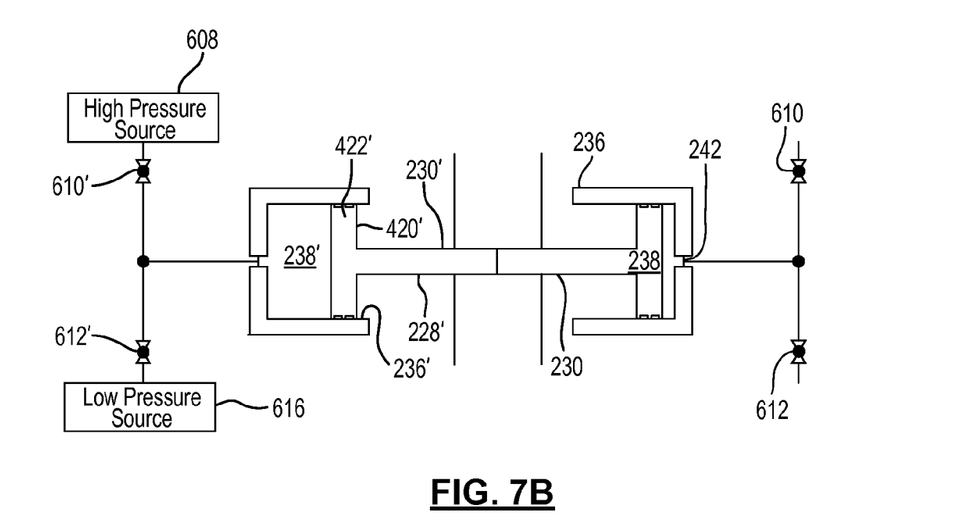
FIG. 7B is a schematic view of a control circuit for control of a movable shroud in an open nozzle position relative to another movable shroud.

Referring now to FIG. 7B, the shrouds are illustrated in a closed position. The shrouds 228' and 230 act as a valve to close off fluid from the volute 238 from entering the vanes of the impeller. Of course, partial movement of either or both shrouds may be made to provide a variable nozzle width. Various intermediate positions of the shrouds between that of FIGS. 7A and 7B would be evident to those skilled in the art. Control of the nozzle widths may be performed by controlling the amount of high pressure fluid and low pressure fluid within the fluid cavities 238 and 238'.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A turbine comprising:
    a housing having a volute, an inlet and an outlet;
    an impeller rotatably coupled to the housing having a shaft defining an axial direction;
    a first shroud disposed within the housing comprising a plurality of nozzle vanes; and
    a second shroud disposed within the housing adjacent to the first shroud so that a nozzle area is formed between the first shroud and the second shroud, said nozzle area having a variable width, said second shroud movable relative to the first shroud to vary the width so that fluid flow from the inlet to the outlet is variable, said second shroud comprising a piston and the housing comprises a piston receiving pocket, said piston and said piston receiving pocket defining a control cavity fluidically coupled to a port through the housing;
    a linear guide moving with the piston in the axial direction, said linear guide comprising a first end coupled to the piston and a second end extending through an opening in said housing;
    a position sensor coupled to the linear guide generating a position signal corresponding to the variable width;
    said port is selectively coupled to a high pressure source and a low pressure source to move the piston within the pocket and the linear guide into or out of the housing and thereby move the second shroud relative to the first shroud to change the variable width.

2. A turbine as recited in claim 1 further comprising a first valve coupled between the high pressure source and the port and a second valve coupled between the low pressure source and the port.

3. A turbine as recited in claim 2 wherein the first valve comprises a first normally closed valve and the second valve comprises a normally closed valve.

4. A turbine as recited in claim 2 further comprising a controller coupled to the position sensor, said controller controlling the first valve and the second valve in response to the position signal.

5. A turbine as recited in claim 1 wherein the first shroud comprises a stationary shroud and the second shroud comprises a moveable shroud.

6. A turbine as recited in claim 1 wherein the first shroud comprises a first moveable shroud and wherein the second shroud comprises a second moveable shroud.

7. A turbine as recited in claim 6 wherein the first shroud comprises a first piston and the housing comprises a first piston receiving pocket, said first piston and said first piston receiving pocket defining a first control cavity and wherein the second shroud comprises a second piston and the housing comprises a second piston receiving pocket, said second piston and said second piston receiving pocket defining a second control cavity.

8. A turbine as recited in claim 7 wherein said first control cavity is fluidically coupled to a first port through the housing and wherein said second control cavity is fluidically coupled to a second port through the housing.

9. A turbine as recited in claim 8 wherein the first port and the second port are selectively coupled to a high pressure source and a low pressure source to move to piston within the pocket and move the second shroud relative to the first shroud.

10. A turbine as recited in claim 9 further comprising a first valve coupled between the high pressure source and the first port, a second valve coupled between the high pressure source and the second port, a third valve coupled between the low pressure source and the first port, a fourth valve coupled between the low pressure source and the second port.

11. A turbine as recited in claim 1 wherein the second shroud comprises a plurality of nozzle vanes.

12. A turbine as recited in claim 1 wherein the first shroud comprises an extension and the second shroud comprises a receiver for slidably engaging the extension.

13. A method of operating a turbine having a housing comprising:
    communicating fluid from a volute of the turbine through a variable nozzle width between a first shroud and a second shroud to rotate an impeller on a shaft, said shaft defining an axial direction, said second shroud coupled to a linear guide;
    communicating fluid to a first control cavity disposed between a piston of the second shroud and a pocket in the housing;
    generating a position signal using a position sensor coupled to the linear guide, said position signal corresponding to the variable width;
    moving the second shroud by moving the piston within the pocket and the linear guide coupled thereto in the axial direction relative to the first shroud to change the variable nozzle width in response to communicating fluid to the first control cavity and the position signal; and thereafter, changing an amount of fluid passing through the variable nozzle width.

14. The method as recited in claim 13 further comprising communicating fluid to a second control cavity disposed between a second piston on the first shroud and a second pocket in the housing, and moving the first shroud relative to the second shroud to change the nozzle width in response to communicating fluid to the second control cavity.

15. The method as recited in claim 13 wherein communicating fluid to the first control cavity comprises communicating fluid through a high pressure valve from a high pressure source and communicating low pressure fluid from a low pressure source though a low pressure valve.

* * * * *